United States Patent
Hillabush et al.

(10) Patent No.: US 6,467,317 B1
(45) Date of Patent: Oct. 22, 2002

(54) LUNETTE TRAILER HITCH LOCK

(76) Inventors: Duane E. Hillabush, 7019 Elizabeth Ct., Valley Springs, CA (US) 95252; Kenneth G. Gustafson, P.O. Box 1204, Pine Grove, CA (US) 95665

( * ) Notice: Subject to any disclaimer, the term of this patent is extended or adjusted under 35 U.S.C. 154(b) by 0 days.

(21) Appl. No.: 09/724,482

(22) Filed: Nov. 27, 2000

(51) Int. Cl.[7] .............................................. E05B 67/38
(52) U.S. Cl. .............................. 70/56; 280/507; 70/14; 70/58
(58) Field of Search ........................... 70/14, 258, 232, 70/54–56, 53; 280/507

(56) References Cited

U.S. PATENT DOCUMENTS

| | | | | |
|---|---|---|---|---|
| 4,186,575 A | * | 2/1980 | Bulle | 70/14 |
| 4,380,160 A | * | 4/1983 | Hoffman | 70/14 |
| 4,440,005 A | * | 4/1984 | Bulle | 70/14 |
| 4,480,450 A | * | 11/1984 | Brown | 70/14 |
| D312,958 S | | 12/1990 | Aguilar, Jr. | |
| 5,332,251 A | * | 7/1994 | Farquhar | 280/507 |
| 5,343,720 A | | 9/1994 | Slater | |
| 5,901,420 A | | 5/1999 | Oda | |
| 5,937,679 A | * | 8/1999 | Villalon, Jr. | 70/58 |
| D417,133 S | | 11/1999 | Niswanger | |
| 6,202,453 B1 | * | 3/2001 | Disher et al. | 70/14 |
| 6,244,614 B1 | | 6/2001 | Bonvillain et al. | 280/507 |
| 6,338,261 B1 | * | 1/2002 | Liu | 70/34 |

* cited by examiner

*Primary Examiner*—Anthony Knight
*Assistant Examiner*—John B. Walsh
(74) *Attorney, Agent, or Firm*—Intellectual Property Law Group LLP; Otto O. Lee; Takashi Hashimoto

(57) ABSTRACT

A lunette trailer hitch lock prevents theft of trailers and other objects equipped with a lunette-style trailer coupler hitch having a lunette eye. The lock device has a top member and a bottom member which are engageable with each other. A conventional step in lock can be used to lock the top member and the bottom member together while sandwiching and plugging the lunette eye, thereby preventing any attempt to access the lunette trailer hitch.

13 Claims, 4 Drawing Sheets

LUNETTE TRAILER HITCH LOCK

BACKGROUND

The present invention relates to a lock device. More particularly, the present invention relates to an apparatus for preventing theft of trailers equipped with a lunette-style trailer coupler hitch.

Trailers and equipments employing the lunette trailer hitch are susceptible to theft. They are easily stolen because of the rather simple method(s) by which they can be towed. Besides being towed by a vehicle utilizing the appropriate hitch, these objects can also be towed by any vehicle simply using a strong rope or chain.

Many devices have been employed in an attempt to prevent the theft of objects equipped with lunette hitch. The simple premise of these items has been to plug the center of the lunette hitch or lunette eye so nothing can pass through it in order to couple the attached trailer, equipment, or any other device to a towing vehicle.

The existing devices, however, have numerous shortcomings. The two most common shortcomings are: (1) structural weakness of the device; and (2) exposed arrangement of the locking mechanism. Many of the existing devices are not structurally strong enough to guard against common burglary tools such as pry bars, bolt cutters, sledgehammers, torches, and hacksaws. They also leave the lock or locking mechanism exposed to thieves for easy access in order to defeat the locking device.

Some of the existing devices are too costly to manufacture. Some of the devices are too complex, while some are too simple to defeat.

Therefore, there is a need to provide a lunette trailer hitch lock having strong structural integrity to prevent the locking mechanism from being defeated. Additionally it is desirable to provide a lunette trailer hitch lock which does not leave the lock or locking mechanism exposed for easy access. It is also very desirable to provide a lunette trailer hitch lock which is extremely durable yet inexpensive to produce. Finally, it is also very desirable to provide a lunette trailer hitch lock which is simple to use yet tough to defeat.

SUMMARY

In one embodiment of the present invention, the lock device has a top member having a raised wall, an internal circular aperture, and a bottom surface including a slot. The lock device also has a bottom member having an upper portion, a lock engaging tang extending from the upper portion, and a bottom portion. The top and bottom members are engageable with each other, such that the slot allows the lock engaging tang to be inserted therein and to protrude within the internal circular aperture.

In another embodiment of the present invention, the bottom member and the top member of the lock device are made of cast iron.

In yet another embodiment of the present invention, the bottom member and the top member are made of cast aluminum.

In still yet another embodiment of the present invention, the bottom member and the top member are made of cast alloys.

In another embodiment of the present invention, the top member engulfs a conventional step in lock, one of which is sold under the trademark, American Lock™ (for example, Model No: 2010), such that upon locking the conventional step in lock, the conventional lock engages the lock engaging hardened tang and access to the conventional lock is hindered, thereby making any attempt to breach the conventional step in lock very difficult.

In yet another embodiment of the present invention, the upper and the lower members are made of a material with a predetermined strength, such that cutting through said members is made very difficult.

Therefore, the present invention satisfies the long felt need to provide a lunette trailer hitch lock having strong structural integrity to prevent the locking mechanism from being defeated. Additionally the present invention satisfies the long felt need to provide a lunette trailer hitch lock which does not leave the lock or locking mechanism exposed for easy access by unauthorized persons. The present invention also satisfies the long felt need to provide a lunette trailer hitch lock which is extremely durable yet inexpensive to produce. Finally, the present invention satisfies the long felt need to provide a lunette trailer hitch lock which is simple to use yet tough to damage.

DRAWINGS

These and other features, aspects, and advantages of the present invention will be better understood from the following drawings, description and appended claims, where:

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The present invention addresses all of the concerns mentioned above. While the present invention plugs the lunette eye or the hole in the center of the lunette hitch to prevent coupling with a towing vehicle as with any other existing lock devices, this invention is novel and different from other devices in that it is structurally far stronger. A preferred embodiment of the present lunette lock device is made of solid cast iron with substantial thickness that it would take an enormous amount of time to cut through with a hacksaw or chainsaw. The present invention can also be made of other metals such as aluminum, stainless steel, titanium, or any of the alloys thereof.

Additionally, the present lock device is extremely resistant to high heat such as torch flames. The metal composition that makes up the lunette lock device tends to bubble when subjected to a torch flame. Application of a torch to defeat this lock device could very well make it more difficult to remove this lock device from the attached object.

In addition, sledgehammers and similar impact tools will not break the instant invention. It is estimated that a healthy, 200-pound adult male could repeatedly strike the present device with an 8-pound sledgehammer for a substantial amount of time without compromising the integrity of the device, based on the experiment conducted by the inventors. More importantly, there are no exposed areas that could be susceptible to bolt cutters to disengage the locking mechanism. Prying devices have no significant area of opportunity in which to apply pressure to the present invention.

The instant lock device is highly unique because it protects the locking mechanism itself. The round, raised wall protects the lock in the center of the device. The lock itself is encompassed by the device and the locking shaft is hidden from view. The lock is not exposed to any threats of prying or cutting.

Figure 1:
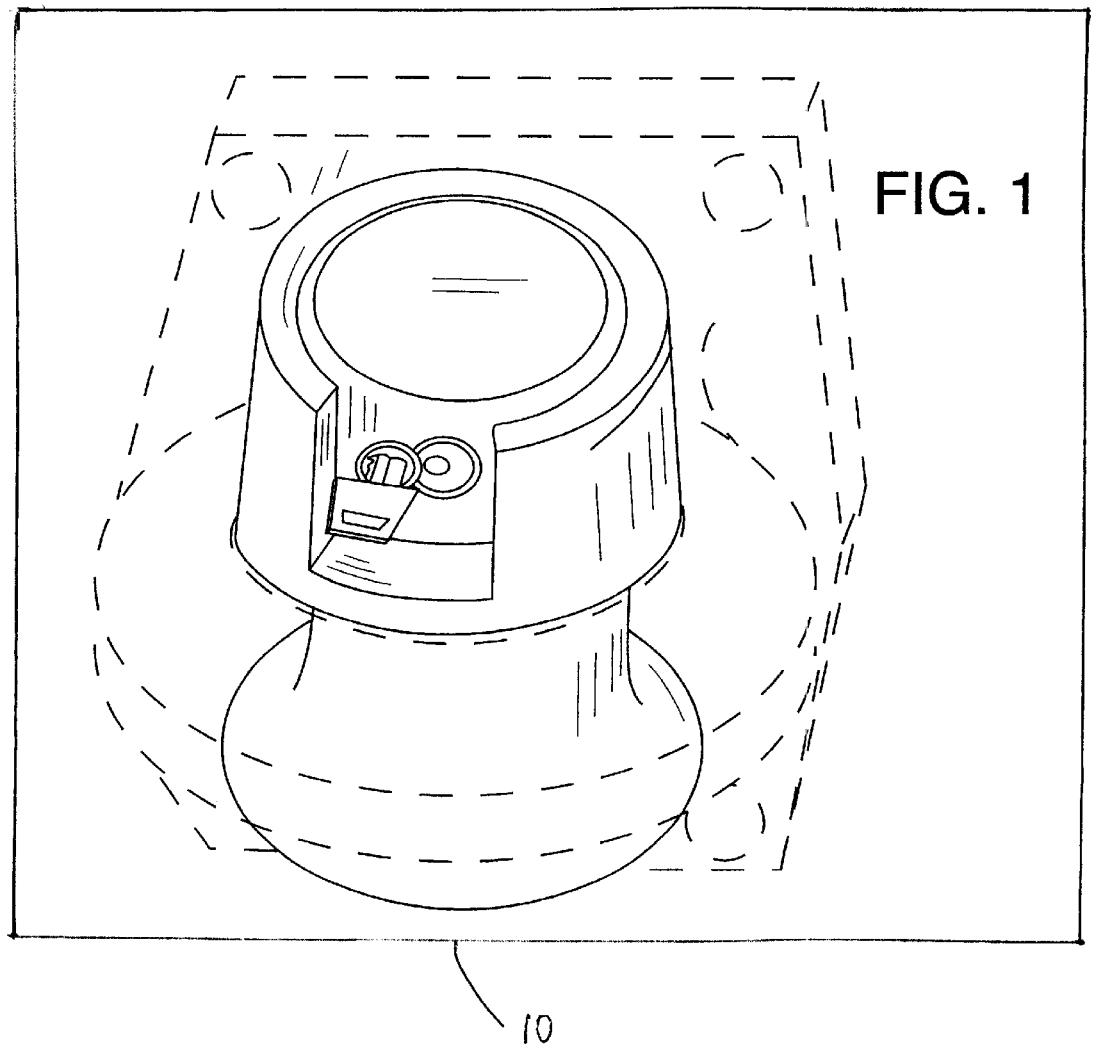
FIG. 1 illustrates a preferred embodiment of the entire device of the present invention that is engaged in a lunette trailer hitch.

In FIG. 1, a lock device 10 is shown in its entirety and engaged with a lunette trailer hitch drawn in broken lines. The lock device 10 engages with the lunette trailer hitch in a manner such that the opening of the lunette trailer hitch, or the lunette eye, is completely plugged with the lock is device 10 and any attempt to engage the lunette trailer hitch is thereby prevented.

Figures 2A, 2B:
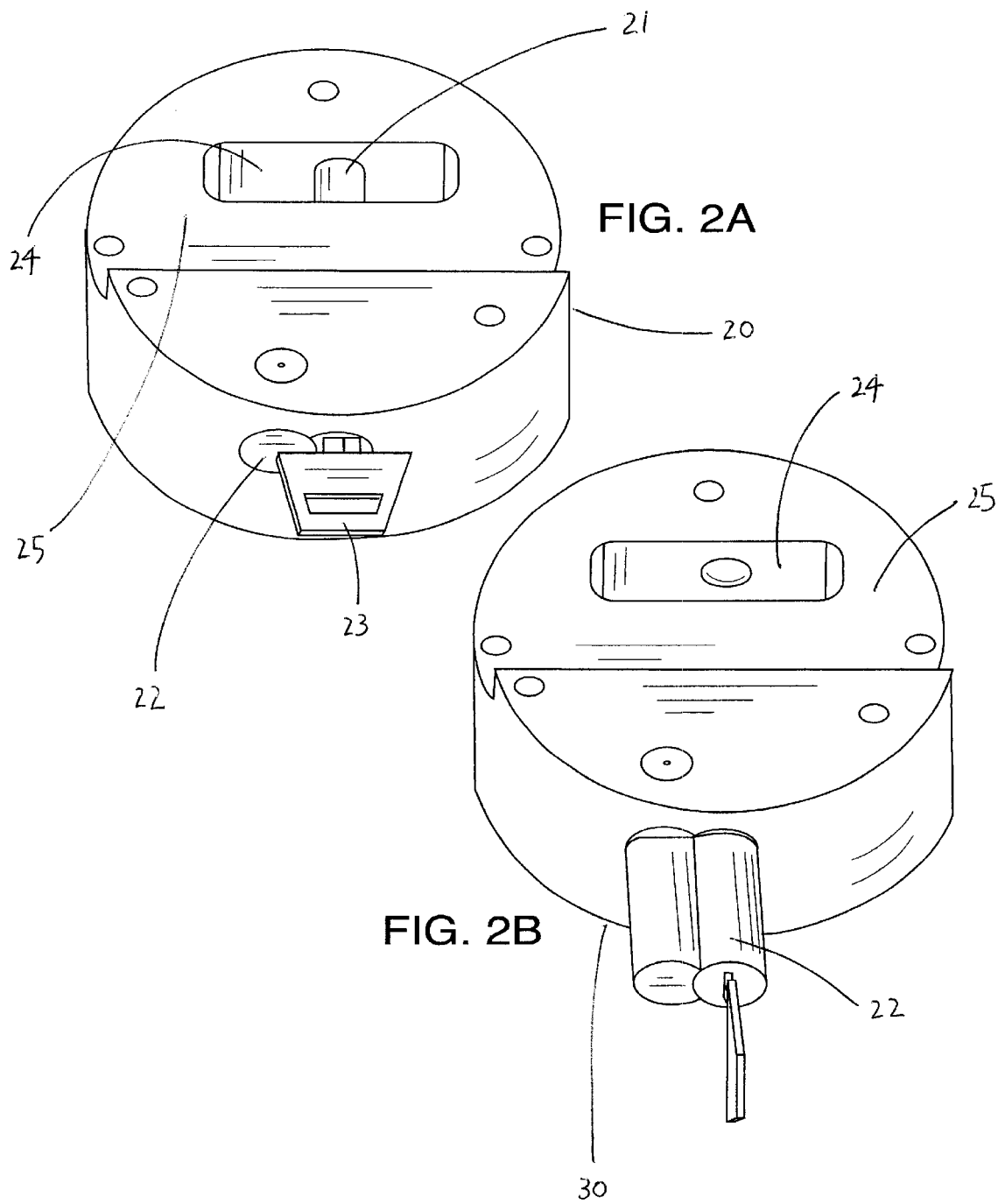
FIG. 2A illustrates a back view of a step in lock that is used in conjunction with the present invention, in its locked state.
FIG. 2B illustrates a back view of a step-in lock that is used in conjunction with the present invention, in its unlocked state.

FIG. 2A shows a bottom view of a step in lock in locked state 20, while FIG. 2B shows a bottom view of a step in lock in unlocked state 30. The step in lock engages with the lock device 10 of the present invention at a lock insert 24. The lock device 10 is shaped such that it accommodates a step in bottom 25 of the step in lock to form a secure juncture. The step in lock secures the lock device 10 when a key 23 is used to engage an extending lock mechanism 22, such that a bolt 21 protrudes through the lock insert 24 and irremovably engages the lock device 10 that is inserted in the lock insert 24.

Figure 3:
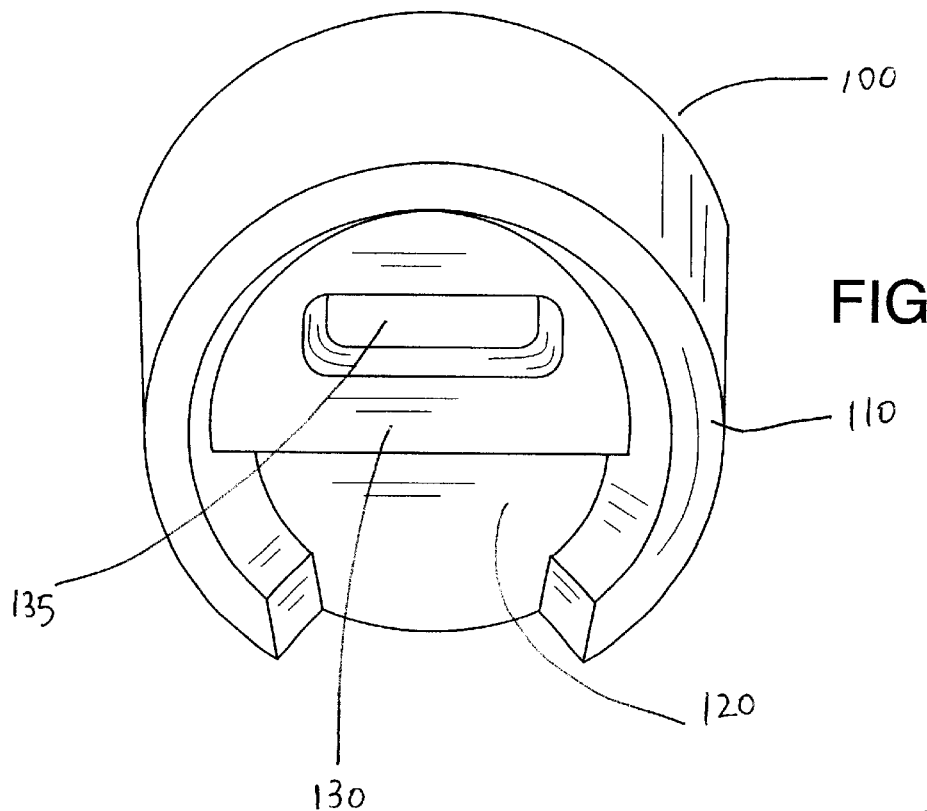
FIG. 3 illustrates a top view of a preferred embodiment of the top of the present invention having a protective ring that encompasses the step-in lock as shown in FIG. 2, and a step-in device.

FIG. 3 shows a top view of a top member 100 of the present invention. The top member 100 has a raised wall 110, an internal circular aperture 120, a raised bottom surface 130, and a slot 135. The internal circular aperture 120 is of a sufficient size to accommodate the step in lock of FIG. 2A or 2B. The raised bottom surface 130 is shaped in a corresponding manner to the step in bottom 25 of the step in lock such that a secure juncture between the step in lock and the top member 100 is made possible. The raised wall 110 encompasses the step in lock when the step in lock is inserted in the internal circular aperture 120 of the top member 100, such that the raised wall 110 protects the step in lock that is placed inside the top member 100 of the lock device 10 and the extending lock mechanism 22 is hidden from view when the step in lock is locked as in step in lock in locked state 20. The step in lock is not exposed to any threats of prying or cutting.

Figure 4:
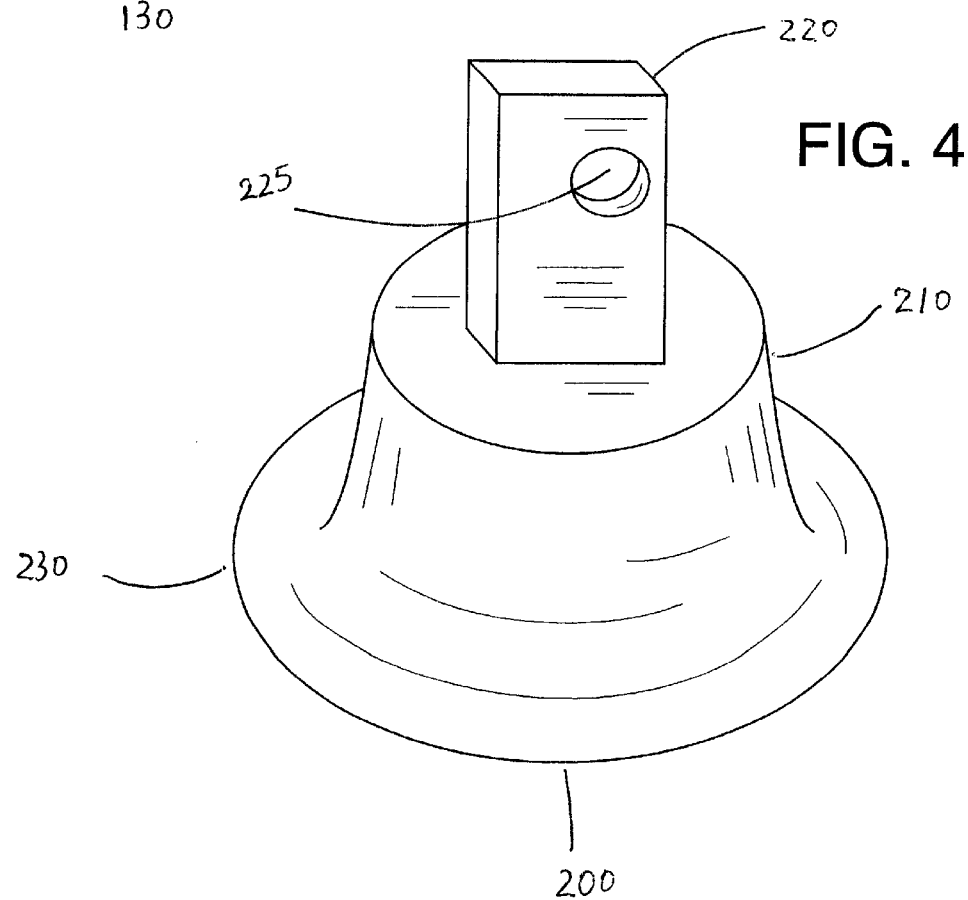
FIG. 4 illustrates a side view of a preferred embodiment of the bottom of the present invention having a hardened tang and a base.

FIG. 4 shows a perspective view of a bottom member 200 of the present invention, which comprises a lower portion 230, a cylindrical upper portion 210, and a lock engaging hardened tang 220 having a central aperture 225. The cylindrical upper portion 210 of the bottom member 200 is shaped such that it can be inserted through the lunette eye. The lower portion 230 is of a sufficient size larger than a diameter of the lunette eye, thereby stopping the lunette trailer hitch from completely passing through the bottom member 200.

Figure 5:
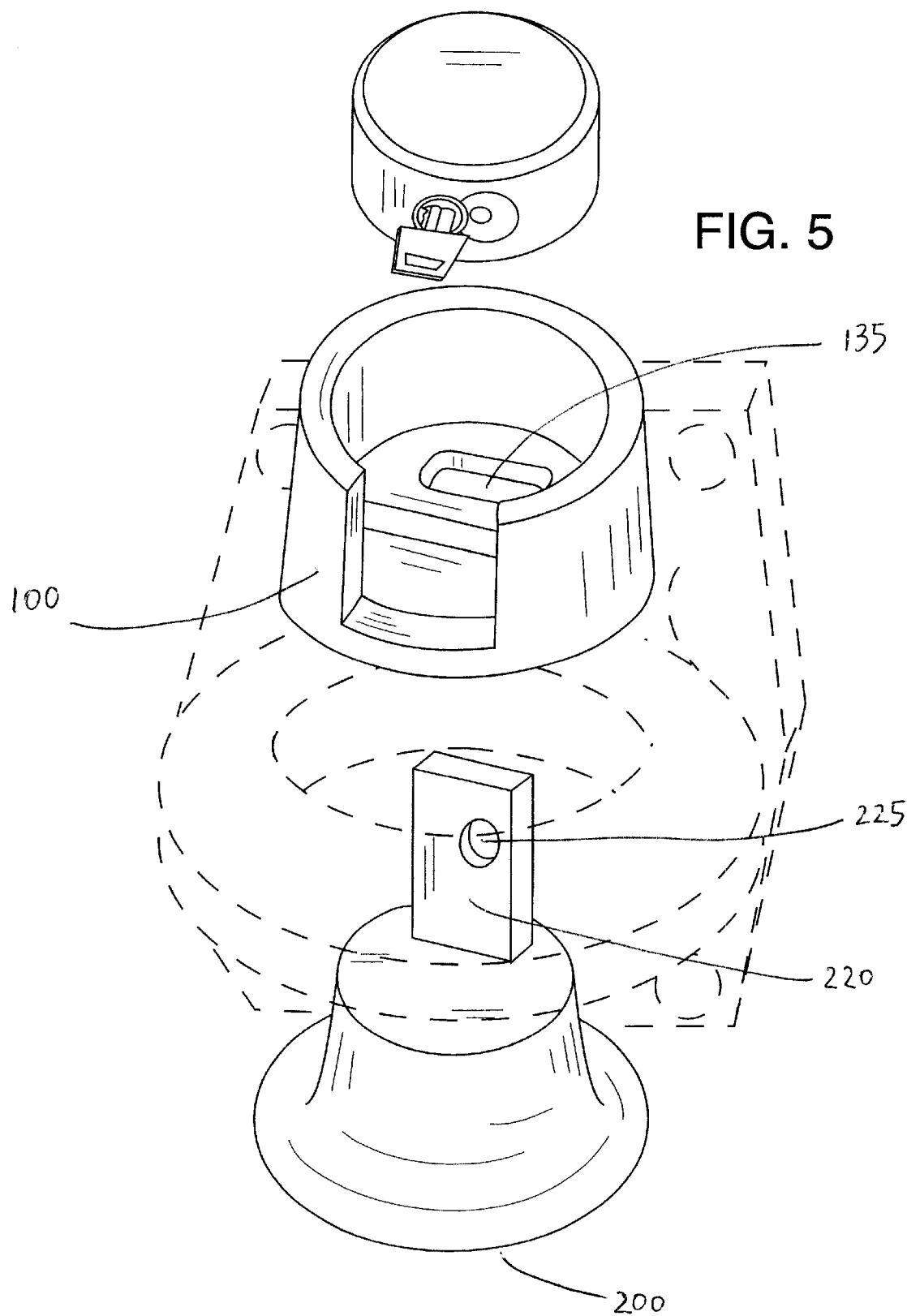
FIG. 5 illustrates an engaging sequence of a preferred embodiment of the entire device of the present invention.

As shown in FIG. 5, the lock engaging hardened tang 220 is capable of being inserted through the slot 135 of the top member 100 and protrudes upward, where the lock engaging hardened tang 220 is further inserted to the lock insert 24 of the step in lock. At this point, when the step in lock is locked, the bolt 21 protrudes into the lock insert 24 and through the central aperture 225 of the bottom member 200, thereby securely locking the top member 100 and the bottom member 200 together while sandwiching the lunette trailer hitch.

A preferred embodiment of the top member 100, the bottom member 200, and all of their parts are made of solid cast iron with substantial thickness that it is structurally extremely strong and it would take an enormous amount of time to cut through with a hacksaw or chainsaw. They can also be made of other metals such as aluminum, stainless steel, titanium, or any alloy thereof. Sledgehammers and similar impact tools will not break the top member 100 or the bottom member 200. It is estimated that a healthy, 200-pound adult male could repeatedly strike the top member 100 of the present device with an 8-pound sledgehammer for at least about eight hours without compromising the integrity of the top member 100 or the bottom member 200 of the present device, based on the experiment conducted by the inventors.

Additionally, the top member 100 and the bottom member 200 of the present lock device are extremely resistant to high heat such as torch flames. The metal composition that makes up the lunette lock device tends to bubble when subjected to a torch flame. Application of a torch to defeat this lock device could very well make it more difficult to remove this lock device from attached object.

Sledgehammers and similar impact tools will not break the top member 100 or the bottom member 200 of the instant invention, either. It is estimated that a healthy, 200-pound adult male could repeatedly strike the present device with an 8-pound sledgehammer for at least about eight hours without compromising the integrity of the device, based on the experiment conducted by the inventors. There are no exposed areas which expose the step in lock that could be susceptible to bolt cutters.

Prying devices have no significant area of opportunity in which to apply pressure to the present invention in order to disengage or remove the step in lock from the present invention.

What is claimed is:

1. A lock device comprising:
   a. a top member having:
      i. a raised wall;
      ii. an internal circular aperture; and
      iii. a bottom surface including a slot;
   b. a bottom member having:
      i. an upper portion;
      ii. a lock engaging tang extending from said upper portion; and
      iii. a bottom portion;

wherein said top and bottom members are engageable with each other, such that said slot allows said lock engaging tang to be inserted therein and to protrude within said internal circular aperture;

and wherein the top member engulfs a step in lock, such that upon locking said step in lock, said step in lock engages the lock engaging tang and access to the step in lock is hindered, thereby making any attempt to breach said step in lock difficult.

2. The locking device as in claim 1 wherein the bottom member and the top member are made of cast iron.

3. The locking device as in claim 1 wherein the bottom member and the top member are made of cast aluminum.

4. The locking device as in claim 1 wherein the bottom member and the top member are made of cast alloys.

5. The locking device as in claim 1 wherein the top member engulfs a step in lock, such that upon locking said step in lock, said step in lock engages the lock engaging tang and access to the step in lock is hindered, thereby making any attempt to breach said step in lock difficult.

6. A lock device comprising:
   a. a top member including:
      i. a raised perimeter wall
      ii. an internal circular aperture encompassed by said raised wall, said internal circular aperture having a diameter that is larger than a step in lock having an extending lock arm and a locking mechanism;
      iii. a key insert window in said raised perimeter wall that allows free passage of said extending lock arm; and
      iv. a bottom surface with a diameter being larger than a diameter of a given lunette trailer hitch eye, said bottom surface including a slot; and
   b. a bottom member including:
      i. a cylindrical upper portion having a diameter that is smaller than the diameter of said lunette eye;
      ii. a lock engaging tang extending from said upper portion, said tang having a central aperture, and said tang being engageable with said step in lock; and
      iii. a lower portion having a diameter that is larger than the diameter of said lunette eye;
wherein said top and bottom members are engageable with each other in a manner such that the two members sandwich a lunette trailer hitch, wherein said lock engaging tang protrudes through said slot of said top member into said internal circular aperture and engages said step in lock, such that upon engaging the locking mechanism of said step in lock, the device secures the lunette trailer hitch from being attached onto or otherwise tampered with.

7. The locking device as in claim 6 wherein the top and bottom members are made of cast iron.

8. The locking device as in claim 7 wherein the top and bottom members are made of cast aluminum.

9. The locking device as in claim 8 wherein the top and bottom members are made of cast alloys.

10. The locking device as in claim 9 wherein the top member engulfs said step in lock, such that upon locking said step in lock, said step in lock engages the lock engaging tang and access to the step in lock is hindered, thereby making any attempt to breach said step in lock difficult.

11. The locking device as in claim 10 wherein the top and bottom members are made of a material with a predetermined strength, such that cutting through said members is rendered difficult.

12. A lock device comprising:
   a. a generally circular top member being made of cast iron, including:
      i. a raised perimeter wall
      ii. an internal circular aperture encompassed by said raised wall, said internal circular aperture having a diameter that is larger than a step in lock having an extending lock arm and a locking mechanism;
      iii. a key insert window in said raised perimeter wall that allows free passage of said extending lock arm; and
      iv. a bottom surface with a diameter being larger than a diameter of a given lunette trailer hitch eye, said bottom surface including a slot; and
   b. a bottom member being made of cast iron, including:
      i. a cylindrical upper portion having a diameter that is smaller than the diameter of said lunette eye;
      ii. a lock engaging tang extending from said upper portion, said tang having a central aperture, and said tang being engageable with said step in lock; and
      iii. a lower portion having a diameter that is larger than the diameter of said lunette eye;
wherein said top and bottom members are engageable with each other in a manner such that the two members sandwich a lunette trailer hitch, wherein said lock engaging tang protrudes through said slot of said top member into said internal circular aperture and engages said step in lock, such that upon engaging the locking mechanism of said step in lock, the device secures the lunette trailer hitch from being attached onto or otherwise tampered with.

13. The locking device as in claim 12 wherein the raised perimeter wall of the top member engulfs said step in lock, such that upon locking said step in lock, said step in lock engages the lock engaging tang and access to the step in lock is hindered, thereby making any attempt to breach said step in lock difficult.

* * * * *